Patented Dec. 14, 1948

2,456,378

UNITED STATES PATENT OFFICE 2,456,378

PROCESS OF SYNTHESIZING CARBAZOLE

Francis E. Cislak and Arthur L. Kranzfelder, Indianapolis, Ind., assignors to Reilly Tar & Chemical Corporation, Indianapolis, Ind., a corporation of Indiana No Drawing. Application December 4, 1943, Serial No. 512,980

8 Claims. (Cl. 260—315)

Our invention relates to a new process of synthesizing carbazole.

Heretofore carbazole has been produced commercially by the processing of coal tar. The amount of carbazole that can be obtained economically by the processing of coal tar is relatively small. Yet our war effort requires large quantities of carbazole.

The present invention makes it possible to obtain carbazole in large quantities, inexpensively and expeditiously. This is done by synthesizing it from orthoaminodiphenyl.

While the literature (Berichte 24, 306 (1891)) indicates that carbazole may be synthesized from orthoaminodiphenyl, that synthesis is by distilling orthoaminodiphenyl through a tube containing weakly glowing lime—a method which yields a tarry material from which carbazole can indeed be recovered, but in yields which are so small as to make the process economically impossible, even under conditions of wartime economy.

We have found it possible to oxidize orthoaminodiphenyl in vapor phase to form carbazole in good yields by partial oxidation with a mildly oxidizing gas. By the term "mildly oxidizing gas" we mean such for instance as carbon dioxide, air, mixed carbon dioxide and air, mixed steam and air, flue gas, or oxygen diluted with steam or carbon dioxide or nitrogen.

We prefer to carry out our invention in continuous process. In so doing, we mix the orthoamiodiphenyl with the mildly oxidizing gas, desirably mixed air and carbon dioxide, and pass the resultant mixture through a suitable reaction vessel, while maintaining suitable oxidation temperature.

A suitable reaction vessel is a stainless steel tube. The tube may be empty, or it may be packed with any suitable contact mass. The contact mass is conveniently small granules of silica or the like, desirably between sand-grain size and pea size; and, if desired, the contact material may be impregnated with an oxidation catalyst.

Oxidation catalysts which are effective are the oxides of the elements of the A subgroups of groups V and VI of the periodic system, either singly or mixed with one another. The catalytic effectiveness of these oxides may be varied by the addition of other oxides, such for instance as oxides of iron, nickel, or manganese.

The mixture that is passed through the reaction tube desirably contains a great excess of air (or other mildly oxidizing gas)—preferably several times as much as is necessary for the desired oxidation.

The temperature of the reaction tube is an elevated one, in comparison with room temperature, but varies, depending on whether or not a catalyst is used, on the nature of the catalysts, on the space velocity, and on the nature of the mildly oxidizing gas used. In the absence of an oxidation catalyst this temperature is desirably in the range of 500° C. to 800° C.; in the presence of oxidation catalysts it is usually in the range of 450° C. to 600° C. The optimum temperature may readily be determined in each case by analysis of the product, and the temperature lowered if much carbon dioxide appears, and raised if neither carbon dioxide nor carbazole appears.

We have found one excellent catalyst to be a tungstic oxide catalyst prepared as follows:

Thirty grams of 85% tungstic acid (C. P.) is dissolved in 250 cc. of hot 6% aqueous ammonium hydroxide. This hot solution is sprayed onto 250 cc. of small granules of silica, desirably between sand-grain and pea size, which are heated well above 100° C.; thus coating the granules. After the spraying, the coated granules are calcined in air at about 400° C.–500° C. for several hours.

Another excellent catalyst we found to be a vanadium pentoxide catalyst prepared as follows:

A hot aqueous suspension of ammonium vanadate is sprayed onto small granules of silica, desirably between sand-grain size and pea size, which are heated well above 100° C.; thus coating the granules. After the spraying, the coated granules are calcined in air at about 400° C. for several hours.

The coated and calcined granules are placed in steel tubes in which the oxidation reaction is to take place, and the mixture of orthoaminodiphenyl and the mildly oxidizing gas is passed through such steel tubes.

*Example 1*

We vaporize orthoaminodiphenyl, mix it with about 3½ to 4½ times its weight of carbon dioxide, and heat (either before or after or during the mixing) to about 400° C. This hot mixture of carbon dioxide and orthoaminodiphenyl is passed over the tungstic oxide catalyst described above at a space velocity of about 500, with the catalyst and the mixture of gases maintained at about 600° C. in any suitable manner. (By space velocity when a catalyst is used, we mean the total volume of gas, measured at standard temperature and pressure, which passes through the tube per hour divided by the volume of the catalyst.) As the mixture of carbon dioxide and orthoaminodiphenyl passes over the catalyst, partial oxidation occurs, to produce carbazole in good yields. The carbazole thus produced is separated from any co-present material in any suitable manner.

*Example 2*

The procedure of Example 1 is repeated, save that instead of using carbon dioxide as the mildly oxidizing gas we use air. The ratio of air to orthoaminodiphenyl is about 3 to 1; the temperature is desirably somewhat lower, of the order of 450° C. to 500° C.; and the space velocity may be materially higher, of the order of 750 to 900.

*Example 3*

The procedure of Example 2 is repeated save that instead of using tungstic oxide catalyst we use a vanadium pentoxide catalyst.

*Example 4*

The procedure of Example 1 or Example 2 is repeated, save that instead of using a tungstic oxide catalyst we place in the reaction tube some small uncoated granules of silica. The ratio of the mildly oxidizing gas to orthoaminodiphenyl is the same as in Example 1 or Example 2; the temperature is desirably about 600° C.–800° C.; and the space velocity is about the same as in Example 1 or Example 2.

*Example 5*

We vaporize orthoaminodiphenyl, mix it with about 4 to 6 times its weight of a mildly oxidizing gas which consists of about 6 to 6.5 volumes of carbon dioxide mixed with one volume of air, and heat (either before or after or during the mixing) to about 400° C. This hot mixture of mildly oxidizing gas and orthoaminodiphenyl is passed over small granules of silica at a space velocity of about 600, with the silica and the mixture of gases maintained at about 750° C. in any suitable manner. As the mixture of gases passes over the silica the orthoaminodiphenyl is partially oxidized, to produce carbazole, in good yields. The carbazole thus produced is separated from any co-present material in any suitable manner.

*Example 6*

We vaporize orthoaminodiphenyl, mix it with about 4 to 6 times its weight of a mildly oxidizing gas which desirably consists of about equal volumes of carbon dioxide and air, and heat (either before or after the mixing) to about 400° C. This hot mixture of mildly oxidizing gas and orthoaminodiphenyl is passed through an empty stainless steel or steel tube at a space velocity of about 150, with the tube and the mixture of gases maintained at about 750° C.–800° C. in any suitable manner. (In this example by space velocity we mean the total volume of gas, measured at standard temperature and pressure, which passes through the tube per hour divided by the volume of the tube.) As the mixture of gases passes through the tube, the orthoaminodiphenyl is partially oxidized, to produce carbazole in good yields. The carbazole thus produced is separated from any co-present material in any suitable manner.

In place of the mixed carbon dioxide and air used in Example 5 and Example 6 we can use mixed steam and air, carbon dioxide alone, or air alone.

We claim as our invention:

1. The process of producing carbazole which comprises the steps of mixing orthoamino diphenyl with an excess of a mildly oxidizing gas, and passing the mixture through a reaction chamber at a space velocity in excess of 150 at a temperature above about 450° C.

2. The process of producing carbazole as set forth in claim 1 in which the amount of mildly oxidizing gas used is at least a multiple of the amount of orthoamino diphenyl present.

3. The process of producing carbazole as set forth in claim 1 in which the reaction chamber contains a catalytic contact mass and the temperature used is in the range of 450° to 600° C.

4. The process of producing carbazole as set forth in claim 1 in which the reaction is carried out in the absence of a catalyst and at a temperature in the range of 500° to 800° C.

5. The process of producing carbazole as set forth in claim 2 in which the reaction chamber contains a contact mass.

6. The process of producing carbazole as set forth in claim 3, with the addition that the oxidation catalyst essentially comprises an oxide of an element of the A sub-groups of groups V and VI of the periodic system.

7. The process of producing carbazole as set forth in claim 3, with the addition that the oxidation catalyst essentially comprises an oxide of tungsten.

8. The process of producing carbazole as set forth in claim 3, with the addition that the oxidation catalyst essentially comprises an oxide of vanadium.

FRANCIS E. CISLAK.
ARTHUR L. KRANZFELDER.

REFERENCES CITED

The following references are of record in the file of this patent:

UNITED STATES PATENTS

| Number | Name | Date |
|---|---|---|
| 2,292,808 | Waterman et al. | Aug. 11, 1942 |
| 2,328,588 | Glahn | Sept. 7, 1943 |
| 2,351,171 | Weinmayr | June 13, 1944 |

FOREIGN PATENTS

| Number | Country | Date |
|---|---|---|
| 168,291 | Germany | Mar. 15, 1906 |

OTHER REFERENCES

Blank, Ber. Deut. Chem. Ger., vol. 24, page 306, 1891.

Hollins, Synthesis of Nitrogen Ring Compounds, N. Y., Van Nostrand (1924), pages 165, 176.

Chem. Abstr., vol. 31 (1937), page 5790 (citing J. Chem. (U. S. S. R.), vol. 7 (1937), pages 879–881). (Copy in div 6.)

Morgan et al., Jour. Soc. Chem. Industry, vol. 57, pages 358–360, 1938.